UNITED STATES PATENT OFFICE.

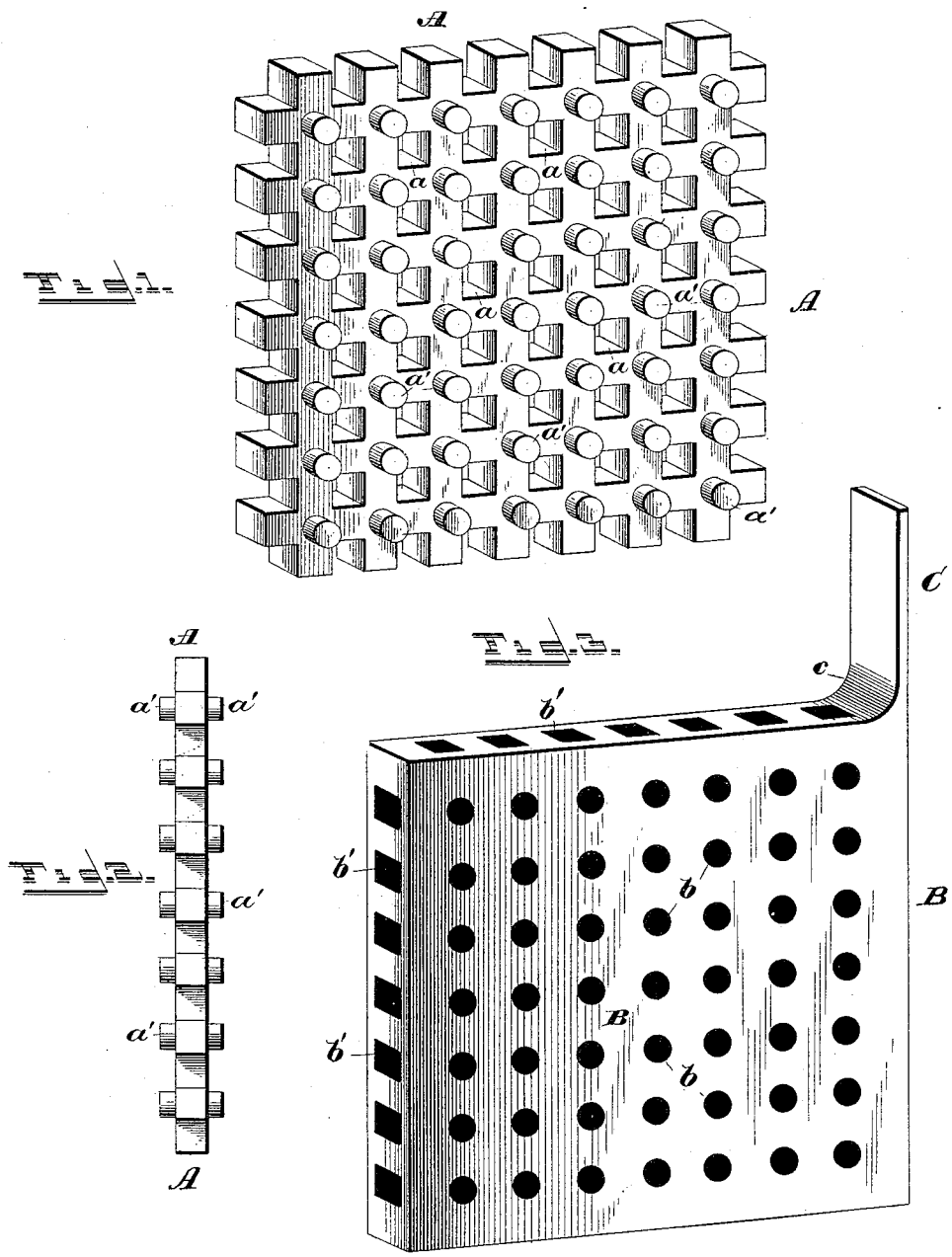

ROBERT M. ELLIOTT, OF WASHINGTON, DISTRICT OF COLUMBIA, ASSIGNOR OF ONE-HALF TO LOUIS BAGGER, OF SAME PLACE.

ELECTRODE FOR SECONDARY BATTERIES.

SPECIFICATION forming part of Letters Patent No. 389,455, dated September 11, 1888.

Application filed June 18, 1888. Serial No. 277,407. (No model.)

*To all whom it may concern:*

Be it known that I, ROBERT M. ELLIOTT, a citizen of the United States, and resident of Washington, in the District of Columbia, have invented certain new and useful Improvements in Electrodes for Secondary Batteries; and I do hereby declare that the following is a full, clear, and exact description of the invention, which will enable others skilled in the art to which it appertains to make and use the same.

This invention relates to secondary batteries.

The object is to produce a support for an electrode for a secondary battery by which separations of portions or particles of the active material and falling of these into the battery-liquid and also any breaking down of the electrode will be prevented; furthermore, to produce a support which shall present the best means for retaining the active material in position without the liability of scaling or falling off; furthermore, to produce a support which shall be of the highest efficiency in use, and this in a ready, practical, and comparatively inexpensive manner; and, finally, the object is to produce a durable and efficient electrode.

With these objects in view, the invention resides in a core or body for an electrode consisting of a suitable plastic substance having perforations and projections.

The invention further consists in a support for the core, the interior of the same being formed with a number of connecting-channels crossing each other and terminating in openings at its edges.

The invention still further consists in the combination, with a support having its interior provided with a number of channels terminating in openings at its edges, of openings connecting with the channels in the interior of the support and extending through the sides of the same, thus presenting a channeled and perforated support.

The invention finally consists in the various novel details of construction, as will be hereinafter fully set forth.

In the accompanying drawings, forming part of this specification, and in which like letters of reference indicate corresponding parts, I have illustrated one form of device embodying my invention, although the same may be carried into effect in various ways without departing from the spirit of the same.

In the drawings, Figure 1 is a perspective view of the core or body of the electrode, showing the perforations and projections of the same. Fig. 2 is a vertical end view of the same, showing more particularly the projections on the sides. Fig. 3 is a perspective view of the finished electrode, showing the lead support, with portions of the core or body extending through opening in the sides and edges of the same.

Referring to the drawings, A designates the core or body of the electrode, which is to be made of any suitable plastic substance, but preferably in this instance of minium or red lead. Through the sides of this body extend a number of perforations, $a$, which are shown in this instance to be of a rectangular shape, although they may be made of any other desired shape. On each side of the body and on that portion formed by the connecting-web of the perforations are formed a number of projections, $a'$, the object for which they are designed being fully described further on.

B designates the support, which is constructed of a suitable metal, but preferably of lead, the sides and edges of which have apertures or openings $b$ and $b'$ extending through them, corresponding to the projections on the edges and sides of the core or body A.

C designates the terminal, which may be cast integral with the support, the base portion $c$ being made thicker than the top in order to give it greater strength.

In carrying this invention into effect it is first necessary to construct the core or body of the electrode. To accomplish this, I first take a mass of a suitable plastic material, preferably minium or red lead, and cut, press, stamp, mold, or otherwise shape it into the structure shown in Fig. 1, having perforations extending through and projections extending beyond its sides. After the structure thus produced has dried sufficiently to admit of its being handled without the danger of destroying its peculiar configuration, it is placed in a mold or flask provided with a suitable filling spout or sprue, care being taken that the edges and projections on the sides of the body rest against the substance with which the flask is filled. Molten lead or other suitable metal is then poured into the flask and passes through and around the body within, the portion remaining in the sprue forming the terminal for the support. The metal that passes through the perforations forms solid bars for connecting the two sides of the support. When the metal has cooled and the completed electrode is removed from the flask, a structure substantially like that shown in Fig. 3 is presented, the black squares and circles representing the minium. The electrode thus produced is then formed under a dynamo in the usual way.

In practice I have found that I may produce a support which will give the same results and yet may be constructed at a much lower figure than by casting the support in one piece. This may be accomplished by stamping or casting the two sides of the support separately, with the channels and apertures, placing the core or body within the two, and then securing the sides together by lead rivets or by solder.

I would have it understood that I do not confine myself to the use of minium alone for the body or core, but may substitute a clay body, which, after the support has been cast, is dissolved out, thus leaving a channeled and perforated support. This is then to be filled with minium in a semi-fluid state, which, when dried, shrinks away from the inner surfaces of the support, and thus allows the battery-fluid to have ready access to the body when undergoing formation. When this support is to be used as a primary battery-electrode, zinc is used instead of lead, and the core of clay instead of minium. It will thus be seen that as a primary battery-electrode it will present large surface exposure, the acid being allowed to flow through and around the same.

It will be seen readily by the foregoing description, taken in connection with the drawings, that this peculiar support will hold the active material in place without the possibility of its peeling or scaling off, thereby preventing any breaking down of the electrode, that it may be constructed at a very slight cost, and that it will be found highly efficient and durable in use, thus presenting a desirable and practical electrode.

Having thus fully described my invention, what I claim as new, and desire to secure by Letters Patent, is—

1. A core or body for an electrode for a secondary battery, consisting of a grating formed of suitable active material in a plastic condition, and having projections upon its surface extending through the conducting-support, so as to expose the active material to the battery-fluid, substantially as described.

2. The combination, with a core or body consisting of a grating formed of a suitable active material, having projections upon its surface, of a conducting-support provided with openings corresponding to the projections on the core, and through which the same extend to expose them to the action of the battery-fluid, substantially as described.

3. An electrode having a support of lead or other metal, provided with vertical, lateral, and longitudinal ducts, solid bars made integral with the support for holding the same together, and openings extending through the sides and edges, substantially as described.

4. An electrode having a support of lead or other metal, provided with vertical, lateral, and longitudinal ducts, solid bars made integral with the support for holding the same together, openings extending through the sides and edges, and a solid terminal cast integral with the support, substantially as described.

In testimony that I claim the foregoing as my own I have hereunto affixed my signature in presence of two witnesses.

ROBERT M. ELLIOTT.

Witnesses:
GEORGE A. WOOSTER,
BENNETT S. JONES.